United States Patent
Bode

(10) Patent No.: US 11,463,161 B2
(45) Date of Patent: Oct. 4, 2022

(54) SYSTEM AND METHOD FOR AUTHORIZING ACCESS IN SATELLITE COMMUNICATIONS

(71) Applicant: ATLAS Space Operations, Inc., Traverse City, MI (US)

(72) Inventor: Brad Arnold Bode, Pacific Palisades, CA (US)

(73) Assignee: ATLAS SPACE OPERATIONS, INC., Traverse City, MI (US)

( * ) Notice: Subject to any disclaimer, the term of this patent is extended or adjusted under 35 U.S.C. 154(b) by 165 days.

(21) Appl. No.: 17/069,779

(22) Filed: Oct. 13, 2020

(65) Prior Publication Data

US 2021/0044348 A1    Feb. 11, 2021

Related U.S. Application Data

(63) Continuation of application No. 16/290,734, filed on Mar. 1, 2019, now Pat. No. 10,841,000.

(51) Int. Cl.
*H04B 7/185* (2006.01)
*H04L 67/10* (2022.01)
(Continued)

(52) U.S. Cl.
CPC ..... *H04B 7/18519* (2013.01); *H04L 12/4641* (2013.01); *H04L 67/10* (2013.01); *H04W 76/10* (2018.02)

(58) Field of Classification Search
CPC ............... H04B 7/18519; H04W 76/10; H04L 12/4641; H04L 67/10
See application file for complete search history.

(56) References Cited

U.S. PATENT DOCUMENTS

| 5,918,157 A | 6/1999 | Weideman et al. |
| 6,690,934 B1 | 2/2004 | Conrad, Jr. et al. |

(Continued)

FOREIGN PATENT DOCUMENTS

| EP | 2779481 A1 | 9/2014 |
| KR | 10-2013-0129363 A | 11/2013 |

OTHER PUBLICATIONS

International Search Report and Written Opinion issued in corresponding PCT/US2020/016988 dated Jun. 5, 2020.
(Continued)

*Primary Examiner* — Kyaw Z Soe
(74) *Attorney, Agent, or Firm* — Pillsbury Winthrop Shaw Pittman LLP

(57) ABSTRACT

The present teachings is generally directed to systems and methods for facilitating communications with a satellite. In some embodiments, a request to communicate with a satellite may be received from a client device, and upon determining that a device identifier associated with the client device is associated with an account authorized to connect to one or more satellite ground stations, a schedule of activity for the account may be retrieved. The schedule of activity may indicate a time period that the client device is authorized to connect to the satellite ground station(s) such that data is communicated between the satellite and the client device, and the satellite ground station(s) may be configured to communicate with the satellite. At a start of the time period, a connection between the client device and the satellite ground station(s) may be generated, and via the connection, data may be provided to the client device.

20 Claims, 7 Drawing Sheets

(51) Int. Cl.
    *H04L 12/46*         (2006.01)
    *H04W 76/10*         (2018.01)

(56) References Cited

U.S. PATENT DOCUMENTS

| | | |
|---|---|---|
| 8,639,182 B2 | 1/2014 | Moore, III |
| 9,059,784 B2 | 6/2015 | Enge et al. |
| 10,225,000 B1 | 3/2019 | Chowdhury et al. |
| 2013/0329630 A1 | 12/2013 | Becker |
| 2018/0083741 A1* | 3/2018 | Motoyoshi ............ H04L 5/0053 |
| 2019/0313357 A1* | 10/2019 | Wang .................. H04W 56/001 |
| 2020/0007414 A1* | 1/2020 | Smith ................... G06F 9/5072 |

OTHER PUBLICATIONS

Notice of Allowance issued in corresponding U.S. Appl. No. 16/290,734 dated Sep. 22, 2020.

* cited by examiner

SYSTEM AND METHOD FOR AUTHORIZING ACCESS IN SATELLITE COMMUNICATIONS

CROSS-REFERENCE TO RELATED APPLICATION(S)

This application is a continuation of U.S. patent application Ser. No. 16/290,734, filed Mar. 1, 2019, which is incorporated herein by reference in its entirety.

BACKGROUND

1. Field

The present teaching generally relates to authorizing access in satellite communications. More specifically, the present teaching relates to a system and method for facilitating satellite communications based on multi-factor authentication.

2. Technical Background

Satellite communications generally involve a client device communicating with a satellite via a satellite modem. Satellite modems may be installed at a satellite ground station. At a satellite ground station there may be one or more satellite dishes that transmit and receive data from orbiting satellites. The client device may access the satellite modem to provide instructions to the satellite and/or to receive telemetry data transmitted from the satellite to the satellite ground station.

Conventionally, an entity that interfaces with the satellite is required to purchase their own satellite modem customized to the specific needs of that entity. However, satellite modems are very expensive. The more satellite ground stations that the entity needs to access to communicate with a satellite, the more satellite modems the entity needs to purchase. One possible solution to this problem is to allow two or more entities to share a satellite modem. However, this imparts security vulnerability in that there needs to be a mechanism implemented to ensure that each entity only has access to their data. Furthermore, the more entities able to access the satellite modem, the greater the chance of a data breach.

Thus, there is a need for methods, systems, and programming that facilitate secure satellite communications while also reducing the cost.

SUMMARY

The following is a non-exhaustive listing of some aspects of the present techniques. These and other aspects are described in the following disclosure.

Some aspects may describe a method for communicating with a satellite, where the method may be implemented by one or more processors configured to execute one or more computer program instructions, and the method including: receiving, from a client device, a request for communicating with a satellite; determining a device identifier associated with the client device; retrieving, upon determining that the device identifier is associated with an account authorized to connect to one or more satellite ground stations, a schedule of activity for the account, where the schedule of activity indicates a time period during which the client device is authorized to connect to the one or more satellite ground stations such that data is communicated between the satellite and the client device associated with the account, and where the one or more satellite ground stations are configured to communicate with the satellite; generating, at a start of the time period, a connection between the client device and the one or more satellite ground stations; and providing, via the connection, data to the client device.

Additional aspects may describe a system for communicating with a satellite, the system including: memory including one or more computer program instructions; and one or more processors that, when the one or more computer program instructions are executed, are configured to: receive, from a client device, a request for communicating with a satellite; determine a device identifier associated with the client device; retrieve, upon determining that the device identifier is associated with an account authorized to connect to one or more satellite ground stations, a schedule of activity for the account, where the schedule of activity indicates a time period during which the client is authorized to connect to the one or more satellite ground stations such that data is communicated between the satellite and the client device associated with the account, and where the one or more satellite ground stations are configured to communicate with the satellite; generate, at a start of the time period, a connection between the client device and the one or more satellite ground stations; and provide, via the connection, data to the client device.

Another aspect may describe a method for communicating with a satellite, the method being implemented by one or more processors configured to execute one or more computer program instructions, the method including: retrieving, upon determining that an account of a client device is authorized to connect to a satellite ground station, a schedule of activity for the account, where the schedule of activity indicates a time period during which the satellite ground stations is authorized to communicate data to a client device associated with the account; generating, at a start of the time period, a connection to the satellite ground station; and obtaining, via the connection, telemetry data from the client ground station.

BRIEF DESCRIPTION OF THE DRAWINGS

The methods, systems, and programming described herein are further described in terms of exemplary embodiments. These exemplary embodiments are described in detail with reference to the drawings. These embodiments are non-limiting exemplary embodiments, in which like referenced numerals represent similar structures throughout several views of the drawings, and wherein.

DETAILED DESCRIPTION

Figure 1:
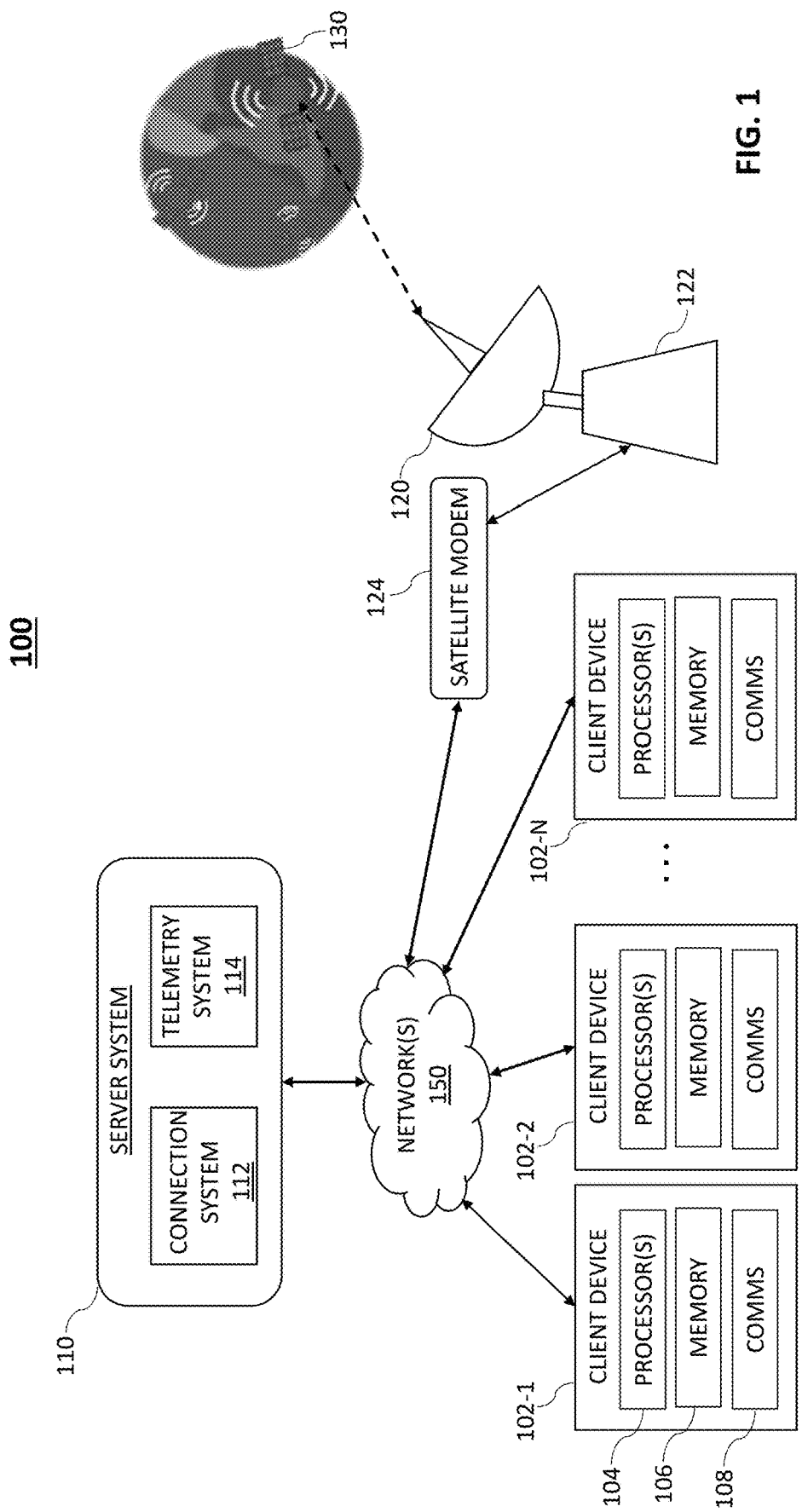
FIG. 1 is an illustrative diagram of an exemplary system for facilitating satellite communications between a client device and a satellite ground station, in accordance with various embodiments.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

To mitigate problems described herein, the inventor had to both devise solutions and, in some cases just as importantly, recognize problems overlooked (or not yet foreseen) by others in the field of satellite communications. Further, because multiple problems are addressed, it should be understood that some embodiments are problem-specific, and not all embodiments address every problem with traditional systems described herein or provide every benefit described herein. That said, improvements that solve various permutations of these problems are described below.

There are thousands of satellites orbiting the Earth currently. These satellites (non-celestial bodies) require the ability to communicate with an antenna on the Earth's surface. Such antennae may be part of a satellite dish that is designed to receive and send signals from/to a satellite. A satellite dish may include an antenna and typically is a structure located at a "satellite ground station." A satellite ground station, as described herein, is a facility that includes one or more satellite dishes capable of communicating with one or more satellites in orbit. Satellite ground stations may also be referred to herein interchangeably as "ground stations" or "ground sites." Every satellite ground station may include hardware to control operations of the satellite ground station, the satellite dish, and communications into and out of the satellite ground station. One hardware component may be a satellite modem. A satellite modem is a type of modem that receives data transmitted from a satellite to a satellite dish located at the satellite ground station. The satellite modem may be integrated into or communicatively coupled with one or more computing devices or systems. In some embodiments, the satellite modem may be configured to transform received data into a format communicable to a client device. For example, a satellite modem may transform an input data stream into a radio signal ("RF"). In order for a client device to obtain data from a satellite and/or provide instructions to a satellite, the client device may connect to a satellite modem at a satellite ground station whose satellite dish is able to communicate with the satellite. In some embodiments, a client device may be configured to connect to multiple satellite modems each associated with a different satellite ground station in order to communicate with one or more satellites during each satellite's orbit.

Satellite modems are typically very expensive. For example, a satellite modem may cost between $40,000 and $160,000. If an entity, e.g., an individual, a group of individuals, a university, a company, etc., wishes to communicate with a satellite, that entity conventionally would purchase and install (or have installed) a satellite modem at a particular satellite ground station. If multiple ground stations are needed to communicate with the satellite, an entity may have to purchase a corresponding number of satellite modems to be installed at each ground station. Therefore, the cost for satellite modems alone can increase dramatically for a given entity. This is especially true as more and more satellite ground stations are constructed globally.

One reason why satellite modems are very expensive is that typically satellite modems have been customized to the individual needs of a particular entity. For example, entity A may have modem 1 located at ground station 1, and entity B may have modem 2 also located at ground station 1. Modem 1 may be customized to handle a particular range of data specific to the needs of entity A while modem 2 may be customized to handle a different range of data specific to the needs of entity B. This setup, while expensive because both entity A and entity B need to purchase their respective modems, is also secure because entity A only has access to modem 1 and entity B only has access to modem 2. Therefore, entity A should be unable to access the data of entity B because entity A only can access modem 1, and similarly entity B should be unable to access the data of entity A because entity B only can access modem 2.

In some embodiments, entity A and entity B may be allowed to share a single modem at ground station 1. As more satellites are sent into orbit, the costs of such satellites is decreasing and, as a consequence, become less customized and entity-specific. Therefore, if the needs of a particular group, e.g., two or more, of entities is common enough as to each not require a customized satellite modem, then the group of entities may share access to a single satellite modem. This can reduce the cost to each entity as a single entity does not need to purchase their own satellite modem.

However, when two or more entities share a single satellite modem, security issues arise. The reason for such security issues is that entity A does not want its data accessed by entity B, and similarly entity B does not want its data accessed by entity A. Additionally, the more entities that are able to access a single satellite modem, the less secure the satellite modem becomes in general to external unauthorized connection attempts. Therefore, what is needed is a technique for allowing two or more entities to share a satellite modem located at a ground site while also ensuring security of the data communicated to/from the satellite modem such that each entity only is able to access their own proprietary data at a particular time when that entity is authorized to do so. Additionally, as more and more satellite ground stations emerge around the world, each entity may now be capable of accessing a larger number of satellite modems, each of which may also be shared. As a result, the networking rules for identifying which entity is authorized to access which satellite modem at what particular time increases in complexity. This problem can further weaken the security of each satellite modem making the satellite modems vulnerable to security breaches.

As a result of the aforementioned drawbacks, there is a need for systems, methods, and programming that allow for an entity to securely connect to and access data from one or more shared satellite modems. Such a need may be alleviated by the techniques described herein, which describe embodiments for a system that facilitates secure communication between client devices and satellite modems. The secure communication may be provided by means of a process that determines whether a particular client device is authorized to access an account on a cloud-based server system, and if so, whether the account is also authorized to access a particular satellite modem at a given time. If the account is determined to be authorized to access the satellite modem at the given time, then a secure connection may be established between the server system and the ground station as well as between the client device and the server system such that telemetry data may be communicated from the satellite to the client device and vice versa. Therefore, a single entity may be allowed to access their data via the satellite modem for a given time period with which they are authorized to do so, preventing any other unauthorized entity or entities from accessing the data.

FIG. 1 is an illustrative diagram of an exemplary system for facilitating satellite communications between a client device and a satellite ground station, in accordance with various embodiments. System 100 of FIG. 1 may include client devices 102-1, 102-2, . . . , 102-N, a server system 110, and a satellite ground station 122. Client devices 102-1, 102-2, . . . , 102-N may individually or collectively be referred to as client devices 102. In some embodiments, client device(s) 102 may be configured to communicate with server system 110 via one or more networks 150. Furthermore, in some embodiments, server system 110 may be configured to communicate with satellite ground station 122 via network(s) 150.

Each client device 102 may include one or more processors 104, memory 106, and communications component 108 (also referred to as "comms"). In some embodiments, client devices 102 may include additional components, such as a display component or components, an input mechanism or mechanisms, and/or an output mechanism or mechanisms. Furthermore, a number "N" of client devices 102 may vary. For example, N may have a range of 2-100,000, however these numbers are not to be construed as limiting. As a number of individuals that desire to communicate with a satellite increases so too would the number of client devices 102 capable of being used, and therefore the value of N may increase accordingly.

Processor(s) 104 may include any suitable processing circuitry capable of controlling operations and functionality of and within client device(s) 102. Processor(s) 104 may include a single processor or a plurality of processors (e.g., distributed processors). Processor(s) 104 may be any suitable processor capable of executing or otherwise performing instructions. Processor(s) 104 may include a central processing unit ("CPU") that carries out program instructions to perform the arithmetic, logical, and input/output operations of client device 102. Processor(s) 104 may execute code (e.g., processor firmware, a protocol stack, a database management system, an operating system, or a combination thereof) that creates an execution environment for one or more computer program instructions. Processor(s) 104 may include a programmable processor. Processor(s) 104 may include general or special purpose microprocessors. A processor may receive instructions and data from a memory (e.g., memory 106). Client device 102 may be a uniprocessor system including one processor (e.g., processor), or a multi-processor system including any number of suitable processors. Multiple processors 104 may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a field programmable gate array ("FPGA") or an application specific integrated circuit ("ASIC"). Furthermore, client device 102 may include a plurality of computing devices (e.g., distributed computer systems) to implement various processing functions.

Memory 106 may include one or more types of storage mediums such as any volatile or non-volatile memory, or any removable or non-removable memory implemented in any suitable manner to store data for client device 102. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 106 may be implemented as computer-readable storage media ("CRSM"), which may be any available physical media accessible by processor(s) 104 to execute one or more computer program instructions stored within memory 106.

Communications component 108 may include any circuitry, hardware, and/or software allowing or enabling one or more components of client device 102 to communicate with another client device 102, server system 110, or any other device and/or system. In some embodiments, communications component 108 may facilitate communications to and from client device 102 via network(s) 150. For example, network(s) 150 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP. Communications circuitry 108 may use any communications protocol, such as any of the previously mentioned exemplary communications protocols. Additional details regarding the architecture of client device 102 is described with reference to FIG. 7 below, and is not repeated here for brevity.

Server system 110 may include one or more computing systems including a connection system 112 and a telemetry system 114. In some embodiments, server 110 may include one or more processors, memory, and communications components, such as processor(s) 104, memory 106, and communications component 108, respectively. Server system 110 may also be configured to include and/or access one or more databases. In some embodiments, server system 110 may be a distributed server system including a plurality of computing devices that may each execute tasks in parallel and/or serially to facilitate the functionalities associated with connection system 112 and/or telemetry system 114. Additional details with regard to the architecture of server system 110 is described below with reference to FIG. 7, and is not included here for brevity.

Connection system 112 may be configured to establish and maintain a secure connection between one or more of client devices 102 and server system 110. For example, connection system 112 may establish a virtual private network ("VPN") connection between client device 102 and server system 110. In some embodiments, connection system 112 may access an account database to determine whether a particular client device requesting to connect to a satellite modem located at a satellite ground station is authorized to do so. As an example, client device 102-1 may request to access satellite modem 124 of satellite ground station 122. The request may include a device identifier associated with client device 102-1. A device identifier may include, but are not limited to, an IP address of a client device, a MAC address of a client device, GPS data related to a location of the client device, biometric data associated with a corresponding individual operating the client device, and temporal data indicating a time or times that the request was sent and/or with which access to a satellite ground station is desired. Using the device identifier, connection system 112 may access the account database to determine if an authorized account of server system 110 is stored within the database including the device identifier as an authorized device. As described herein, an authorized account may include an account registered to access one or more services of server system 110. Such services may include satellite communication services (e.g., receipt of telemetry data), satellite modem configurations, user interface controls, email, messaging, etc. Each account may include one or more device identifiers associated with different client devices that are allowed to communicate with a satellite modem 124 of satellite ground station 122 via a secure connection established between server system 110 and satellite modem 124. If the device identifier of the requesting client device, e.g., client device 102-1, is listed as being an authorized device identifier for an authorized account of server system 110, then connection system 112 may be configured to establish a first secure connection, e.g., a first VPN connection, between client device 102-1 and connection system 112.

In some embodiments, connection system 112 may further be configured to determine whether the authorized account with which the requesting device is associated, e.g., client device 102-1, is authorized to communicate with satellite modem 124. The determination may depend on a schedule of activity indicative of a flight/orbital path for a satellite 130 with which the account desires to obtain telemetry data from, or desires to provide instructions to. For example, a time period when satellite 130 is within a range of satellite dish 120 such that a radio signal can be transmitted from satellite 130 to an antenna of satellite dish 120 depends on the orbital position of satellite 120 and the geographical location and orientation of satellite dish 120. Generally speaking, satellite dish 120 is capable of being in communication range of satellite 120 during a discrete time period, which may vary from day to day. In some embodiments, a schedule of activity e.g., when a particular satellite is accessible by a particular ground station's satellite dish, may be predetermined and stored within a flightpath database.

Upon establishing the secure connection between client device 102 and server system 110, connection system 112 may be configured to access the flightpath database and retrieve a schedule of activity associated with the authorized account. The schedule of activity may indicate which satellite ground stations include satellite dishes capable of communicating with a satellite associated with the authorized account and during what time periods. Based on the schedule of activity, connection system 112 may determine whether the authorized account is authorized to access a desired satellite ground station at a given time. For example, a schedule of activity for an authorized account associated with a device identifier of a requesting client device 102 may indicate that satellite 130 is operable to transmit telemetry data to satellite dish 120 at ground station 122 between time T1 and time T2. If the request to access satellite ground station 122 is received from client device 102 at time a time t such that t is between times T1 and T2, then connection system 112 may determine that the authorized account associated with client device 102-1 can be securely connected to satellite modem 124 of ground station 122. In this scenario, connection system 112 may be configured to establish a second secure connection (e.g., a VPN connection) between server system 110 and satellite modem 124, which may persist until time T2. In some embodiments, at time T2, server system 110 may be disconnected such that data transmission between satellite ground station 122 and server system 110 is discontinued. If, however time t is before time T1 or after time T2, then connection system 112 may determine that the authorized account associated with client device 102 is not authorized to connect to satellite modem 124 at the current time. In this instance, connection system 112 may maintain the secure connection with client device 102 until time T1 or may terminate the secure connection between server system 110 and client device 102.

Telemetry system 114 may be configured to facilitate the streaming of telemetry data between satellite modem 124 and client device 102. Upon establishing the first secure connection between client device 102 and server system 110, and the second secure connection between server system 110 and satellite modem 124, telemetry system 114 may "connect" the first and second secure connections. As a result, telemetry data received from satellite 130 by satellite dish 120 may be transmitted by satellite modem 124 to client device 102. In some embodiments, telemetry system 114 may be configured to augment, cache, and/or translate the telemetry data for easier processing by client device 102. For example, the telemetry data may be cached in memory of telemetry system 114 for data persistence or for additional access at a later time. As another example, telemetry system 114 may translate the telemetry data from a received format (e.g., bitstream) to another format (e.g., RF signal).

Using the above-mentioned process, a given client device may be able to access a given satellite modem only during a particular time period with which their associated account is authorized. Therefore, two or more entities—each associated with a different client device 102—may be capable of sharing satellite modem 124 located at satellite ground station 122. In some embodiments, only one authorized account may be capable of securely connecting to satellite modem 124 at a given time, and therefore data security for different entities sharing satellite modem 124 may be preserved.

Figure 2:
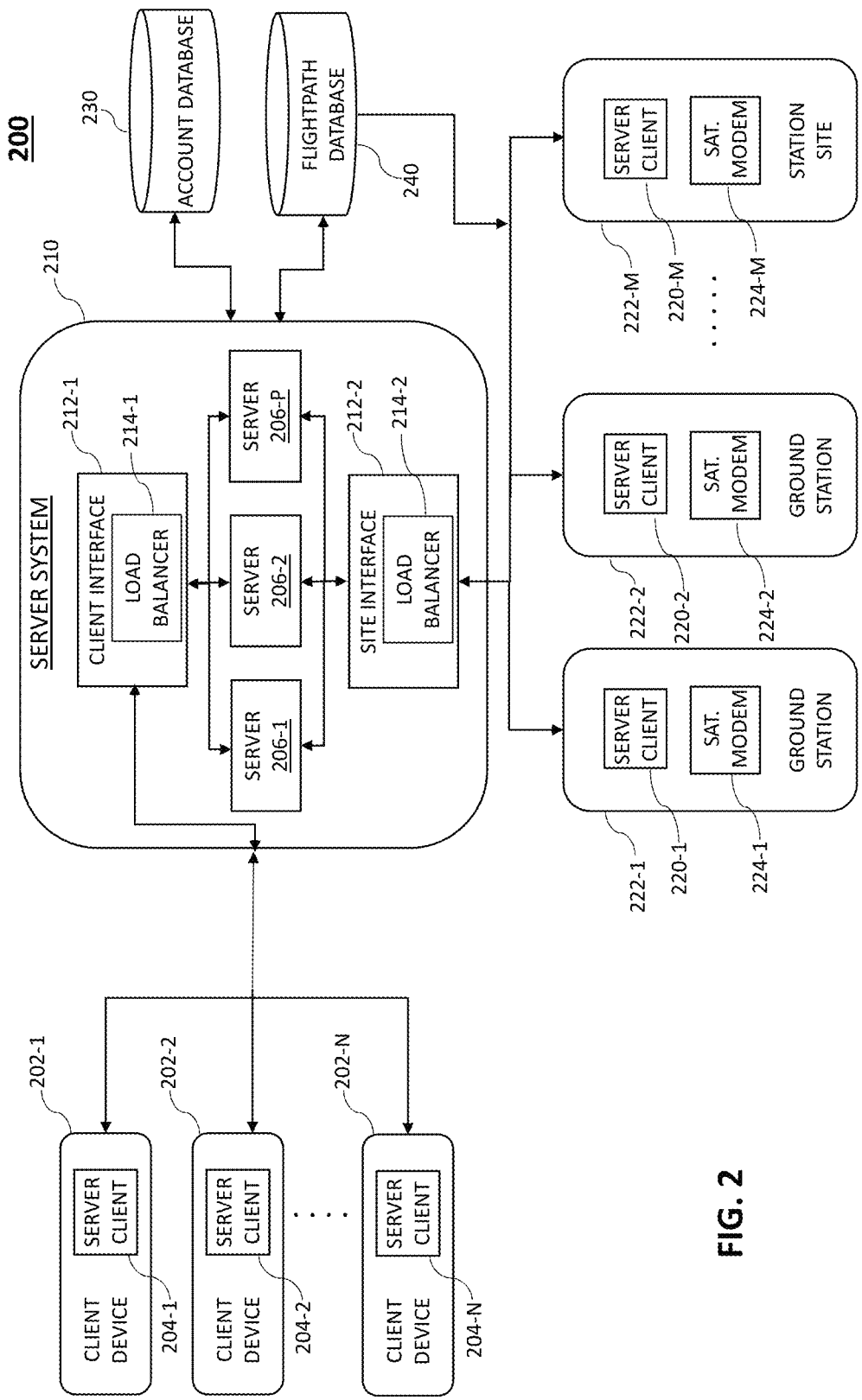
FIG. 2 is an illustrative schematic of an exemplary system for facilitating secure communications between a client device and a satellite ground station, in accordance with various embodiments.

FIG. 2 is an illustrative schematic of an exemplary system for facilitating secure communications between a client device and a satellite ground station, in accordance with various embodiments. Server system 200 of FIG. 2 may include client devices 202-1, 202-2, . . . , 202-N, system 210, account database 230, flightpath database 240, and satellite ground stations 222-1, 222-2, . . . , 222-M. Each client device 202-1, 202-2, . . . , 202-N may execute a server client 204-1, 204-2, . . . , 204-N, respectively, thereon to facilitate communications with server system 210, an account database 230, a flightpath database 240, and one or more of satellite ground stations 222-1, 222-2, . . . , 222-M. Similarly, each satellite ground station 222-1, 222-2, . . . , 222-M may execute an instance of server client 220-1, 220-2, . . . , 220-M, respectively, thereon to facilitate communications with server system 210, account database 230, flightpath database 240, and client devices 202-1, 202-2, . . . , 202-N. Client devices 202-1, 202-2, . . . , 202-N may be referred to individually as client device 202 or collectively referred to as client devices 202; server clients 204-1, 204-2, . . . , 204-N may be referred to individually as server client 204 or collectively referred to as server clients 204; server clients 220-1, 220-2, . . . , 220-M may individually be referred to as server client 220 or collectively referred to as server clients 220; and satellite ground stations 222-1, 222-2, . . . , 222-M may be individually referred to as satellite ground station 222 or collectively be referred to as satellite ground stations 222. Client devices 202, server system 210, and satellite ground stations 222 may be substantially similar to client devices 102, server system 110, and satellite ground stations 122 of FIG. 1, and aspects of the prior description may apply. Furthermore, while account database 230 and flightpath database 240 are illustrated as being external to server system 210, this is merely illustrative as account database 230 and/or flightpath database 240 may be part of server system 210 or may be external to server system 210.

Each client device 202 may include one or more processors, memory, and a communications component, such as processor(s) 104, memory 106, and communication component 108 of FIG. 1. In some embodiments, the processor(s) of client device 202 may execute one or more software applications, such as server client 204. Server client 204 may be a particular computer program, or programs, that access a service of server system 210. For example, server system 210 may facilitate one or more functionalities, e.g., facilitating secure connections between client devices 202 and satellite ground stations 222, and server client 204 may allow client device 202 to access at least some of those functionalities. Similarly, one or more processors located at a computing system at satellite ground station 222 may execute one or more computer programs, such as server client 210, to facilitate access to a service of server system 210. In some embodiments, the service provided by server system 210 is the same service provided to both client devices 202 via server client 204 and satellite ground stations 222 via server client 220. In some embodiments, the service provided by server system 210 accessed by client devices 202 via server client 204 is different than that of the service provided by server system 210 accessed by satellite ground stations 222 via server client 220.

As seen in FIG. 2, each satellite ground station includes a satellite modem. For example, satellite ground station 222-1 may include satellite modem 224-1, satellite ground station 222-2 may include satellite modem 224-2, and satellite ground station 222-M may include satellite modem 224-M. In some embodiments, satellite modems 224-1, 224-2, . . . , 224-M may individually be referred to as satellite modem 224 or collectively be referred to as satellite modems 224. Furthermore, satellite modem 224 may be substantially similar to satellite modem 124 of FIG. 1, and aspects of the prior description may apply.

In some embodiments, an entity operating client device 202 may submit a request to obtain telemetry data from satellite ground station 222. In particular, the telemetry data may be transmitted from a satellite in orbit (e.g., satellite 130 of FIG. 1) to a satellite dish located at satellite ground station 222. The telemetry data may then be communicated to external devices and systems via a satellite modem, e.g., satellite modem 224. In some embodiments, the entity operating client device 202 may submit a request to provide instructions and/or information to an orbiting satellite. For example, information may be sent to the satellite, e.g., satellite 130, in the form of commands that indicate what actions the satellite is to perform and when those actions are to be performed. The actions may include, without limitation, turning on one or more sensors, turning off one or more sensors, when to turn on or off one or more sensors, and/or when to send data to earth, e.g., a satellite ground station. In some embodiments, the data may be formatted in a customized manner using propriety commands, code, and rules, however open source data formats may also be used. Furthermore, the data format of the commands may be encrypted using various encryption techniques. In either scenario, the request may be sent from client device 202 to server system 210. For example, server client 204 may facilitate the transmission of the request to server system 210. In some embodiments, server client 204 may render a user interface ("UI") on a display screen of client device 202. The UI may allow for an individual to input commands that will be provided to server system 210. The UI may additionally or alternatively be configured to display received telemetry data as well as facility operations to be performed to the telemetry data. Furthermore, one or more services provided by server system 210 may be accessible via the UI rendered on the display screen of client device 202.

Server system 210 may include a client interface 212-1, a satellite ground station or site interface 212-2, and one or more servers 206-1, 206-2, . . . , 206-P.

Servers 206-1, 206-2, . . . , 206-P may individually be referred to as server 206 or collectively be referred to as servers 206. In some embodiments, a number "P" of servers may be dependent on an amount of activity occurring on server system 210. For example, as more and more requests are received from client devices 202, the number P of servers 206 employed by server system 210 may increase. In some embodiments, each server 206 may include a computing device or series of computing devices. For example, each server 206 may include one or more processors, memory, and communications functionality, such as e.g., processors 104, memory 106, communications component 108. A more detailed description of the computing system that servers 206 may employ is detailed in FIG. 7. Each server 206 may be situated in a same location (e.g., a server farm) or one or more servers 206 may be located at different physical locations, such as in the case of a distributed server system. In some embodiments, if additional server devices are needed, server system 210 may be configured to allocate additional processing resources to accommodate the additional workload. For example, additional computing devices may be added in blocks to server system 210. In some embodiments, the number P of servers 206 may be dynamically changing depending on the needs of client devices 202 and/or satellite ground stations 222. In a similar manner the number of computing devices used may decrease if less processing capabilities are needed. In some embodiments, a fixed number of servers 206 may remain allocated to the processing of requests, e.g., three servers 206.

In some embodiments, a request sent from client device 202, and in particular server client 204 of that client device 202, is transmitted over network(s) 150 to server system 210. Upon receipt by server system 210, the request is provided to client interface 212-1. Client interface 212-1 may be configured to coordinate traffic for all incoming requests from client devices 202, and may also be configured to facilitate the communication of telemetry data (or other data) to an intended recipient client device 202. Client interface 212-1 may include a load balancer 214-1. In some embodiments, load balancer 214-1 is configured to monitor a workload status of each server 206 to determine which server or servers have available processing capabilities to process a request sent from client device(s) 202. Depending on the available processing capabilities of each of servers 206, load balancer 214-1 may direct an incoming request to a particular server 206 for processing the request. For example, if a request comes in from client device 202-1, load balancer 214-1 may query each of servers 206 to determine each one's bandwidth. If servers 206-2, . . . , 206-P are operating at X-percent capacity, and server 206-1 is operating at Y-percent capacity, where Y is less than X, load balancer 214-1 may direct the request to server 206-1.

Each server 206 may be configured to execute one or more functionalities when processing requests. In some embodiments, the request received by server 206 may be to connect to a satellite ground station, e.g., satellite ground station 222, to obtain telemetry data. Upon receipt of a request from client device 202, load balancer 214-1 may determine a server 206 to direct the request to. Server 206 that receives the request may then determine whether the client device that sent the request is authorized to access the functionalities of server system 210. In some embodiments, server 206 may access account database 230 to determine whether the requesting client device 202 is allowed to send the request to server system 210 and/or communicate with one of satellite ground stations 222.

Figure 4:
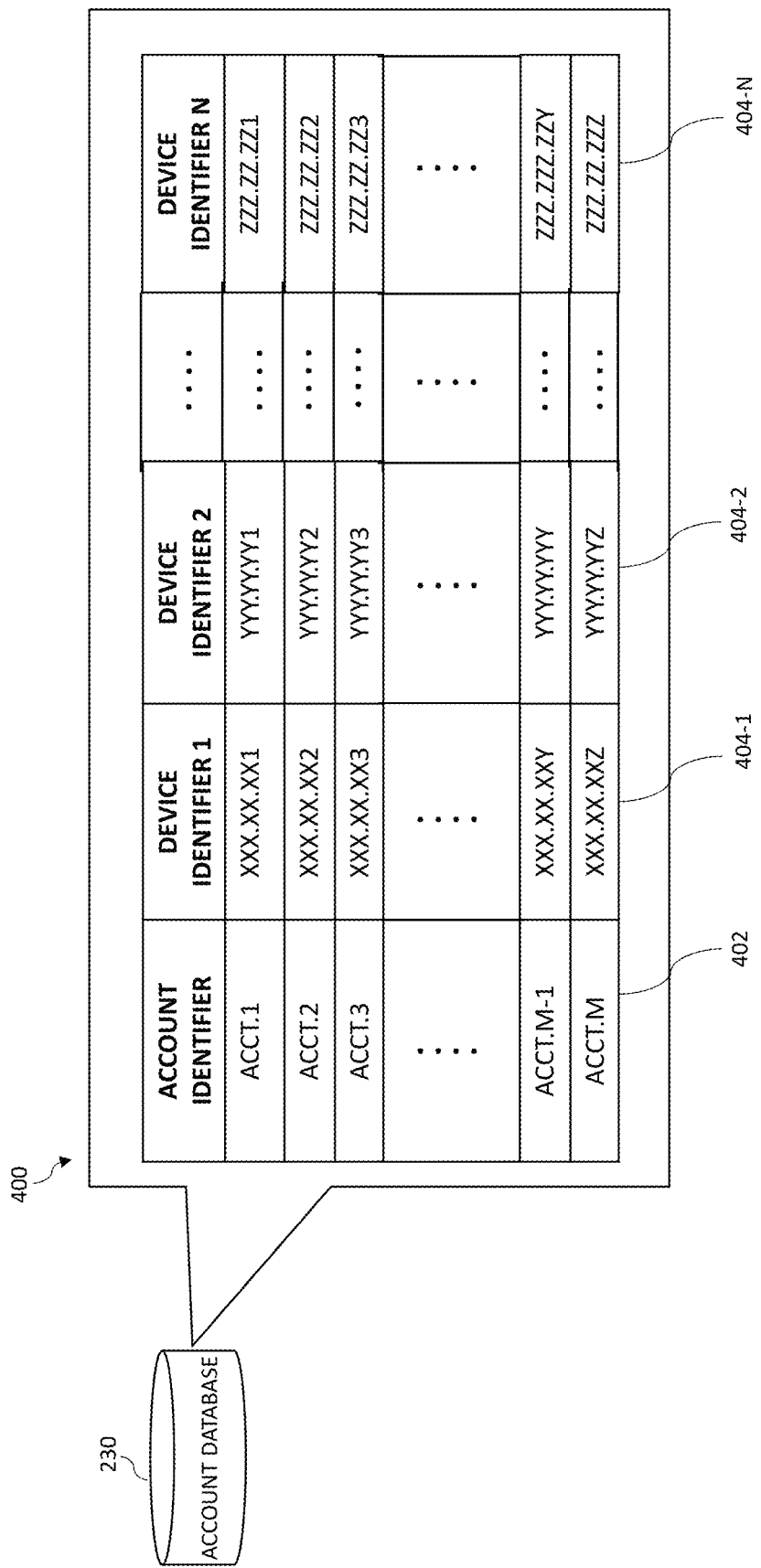
FIG. 4 is an illustrative schematic of an exemplary account database used for authenticating a client device attempting to securely connect to a satellite ground station, in accordance with various embodiments.

FIG. 4 is an illustrative schematic of an exemplary account database used for authenticating a client device attempting to securely connect to a satellite ground station, in accordance with various embodiments. Account database 230 may be constructed in any suitable manner. For example, account database 230 may be a relational database, a non-relational database, an XML database, or a different database type. In some embodiments, account database 230 may be stored in memory of server system 210 (e.g., an in-memory database), a distributive database (e.g., distributed to one or more memory devices), and/or a cloud-based database. Account database 230 may also employ database management software to organize, store, and access data. In some embodiments, account database 230 may include an index for fast look-up and retrieval of data stored therein. For instance, the index may include information indicating memory locations of each device identifier and/or account identifier so that a fast look-up of the corresponding identifier may occur.

In FIG. 4, account database 230 may include a table 400 that stores various account identifiers ("IDs") related to authorized accounts of server system 210. In some embodiments, an entity, e.g., an individual, group of individuals, university, and/or company, may register an account with server system 210 that allows that entity to access certain services and functionalities of server system 210. For example, an entity seeking to connect to one or more satellite ground stations may be capable of doing so via the secure connection capabilities of server system 210. To register an account with server system 210, an entity may be required to input certain information, such as, and without limitation, names, ages, location information, security credentials, payment information to schedule a payment or purchase the service from server system 210, and/or device information of devices that are approved by the entity to log into the account and access server system 210.

In some embodiments, each account may be allowed to list N different devices having permission of the entity to connect to server system 210. The device identifiers associated with each device may be pre-loaded by an administrator of the account such as an account creator. For example, an entity may input device identifiers of one or more devices approved to log-in to the authorized account and access the functionalities of server system 210.

In some embodiments, table 400 may include a first column 402 listing account identifiers each associated with an authorized account of server system 210. Each account identifier may be listed within column 402 in a different row. For example, a first account of server system 210 may have a first account identifier "ACCT.1," while a second account of server system 210 may have a second account identifier "ACCT.2." In total there may be M-account identifiers corresponding to M authorized accounts. As mentioned above, each account may include one or more device identifiers of devices authorized to access the authorized account of server system 210. Table 400 may include N columns 404-1, 404-2, . . . , 404-N that store device identifiers of different devices associated with different accounts. Each row of columns 404-1, 404-2, . . . , 404-N may include a different device identifier associated with a corresponding account. For example, the first row of table 400, e.g., for account identifier "ACCT. 1," may include a first device identifier "XXX.XX.XX1" stored in column 404-1 associated with a first client device. Continuing this example, the first row of table 400 may include a second device identifier "YYY.YY.YY1" stored in column 404-2 associated with a second client device. In the aforementioned example, both the first client device and the second client device, having device IDs XXX.XX.XX1 and YYY.YY.YY1 respectively, may be approved to log-in to an account having account identifier ACCT.1 on server system 210. In some embodiments, the number of device identifiers stored as being associated with each account may vary, and some accounts may include more, fewer, or a same number of authorized device identifiers.

Referring back to FIG. 2, when the request is routed to server 206 from load balancer 214-1, server 206 may extract a device identifier from the request. The device identifiers may include any suitable representation mechanism for client device 202 such as, and without limitation, an IP address of client device 202, a MAC address of client device 202, a phone number of client device 202, a unique authentication identifier of client device 202, a serial number of client device 202, etc. After the device identifier is extracted, server 206 may query each of columns 404-1, 404-2, . . . , 404-N of table 400 from account database 230 to determine whether the extracted device identifier matches a stored device identifier. If so, the account identifier associated with the extracted device identifier may be retrieved from database 230 by server 206. For example, server 206 may extract a device identifier YYY.YY.YY3 from a request received from client device 202-1. Server 206 may then query account database 230 using device identifier YYY.YY.YY3 to determine whether that device identifier is associated with an authorized account. Server 206 may then retrieve account identifier ACCT.3 upon determining that device identifier YYY.YY.YY3 is a registered device identifier associated with the authorized account having account identifier ACCT.3.

If, however, server 206 determines that the device identifier extracted from the request is not found within table 400, server 206 may indicate to client interface 212-1 that no matching account was found for that request. Client interface 212-1 may then transmit a message back to the requesting client device 202 indicating that client device 202 is not authorized to access the services of server system 210. Alternatively, if server 206 determined that the extracted device identifier was not found within account database 230, client interface 212-1 may communicate a message to the requesting client device 202 for an additional form of authorization, or for a verification mechanism that could be used to verify that client device. For example, client interface 212-1 may request that an individual operating client device 202-1 input one or more log-in credentials, e.g., user name, password, fingerprint scan, etc., in order to verify an identity of an individual operating client device 202-1. Upon successful verification, the device identifier associated with client device 202 that sent the request may be added to a column 404 of table 400 for a corresponding account.

In some embodiments, upon determining that the device identifier of the request client device 202 is associated with an authorized account, server 206 may facilitate the establishment of a secure connection between client device 202 and server system 210. For example, client interface 212-1 may establish a VPN connection between client device 202 and server system 210. The secure connection may allow for data to be transmitted from client device 202 to server system 210 and vice versa in a secure manner. In some embodiments, client interface 212-1 may allow the secure connection to persist for a predetermined amount of time, continually, or until one or more actions occur. For example, the secure connection can be maintained while server 206 determines whether the account associated with the account identifier is allowed to access a particular ground station 222 and stream telemetry data therefrom or provide instructions thereto.

In some embodiments, server 206 may be configured to determine whether the account of the requesting client device 202 is allowed to communicate with one or more satellite ground stations 222 at a current time. To determine this, server 206 may query flightpath database 240 to obtain a schedule of activity associated with the identified account. The schedule of activity associated with a particular account may include information related to the orbital trajectory of one or more satellites, e.g., satellite 130, that the entity associated with the account owns, manages, and/or interfaces with.

Figure 5:
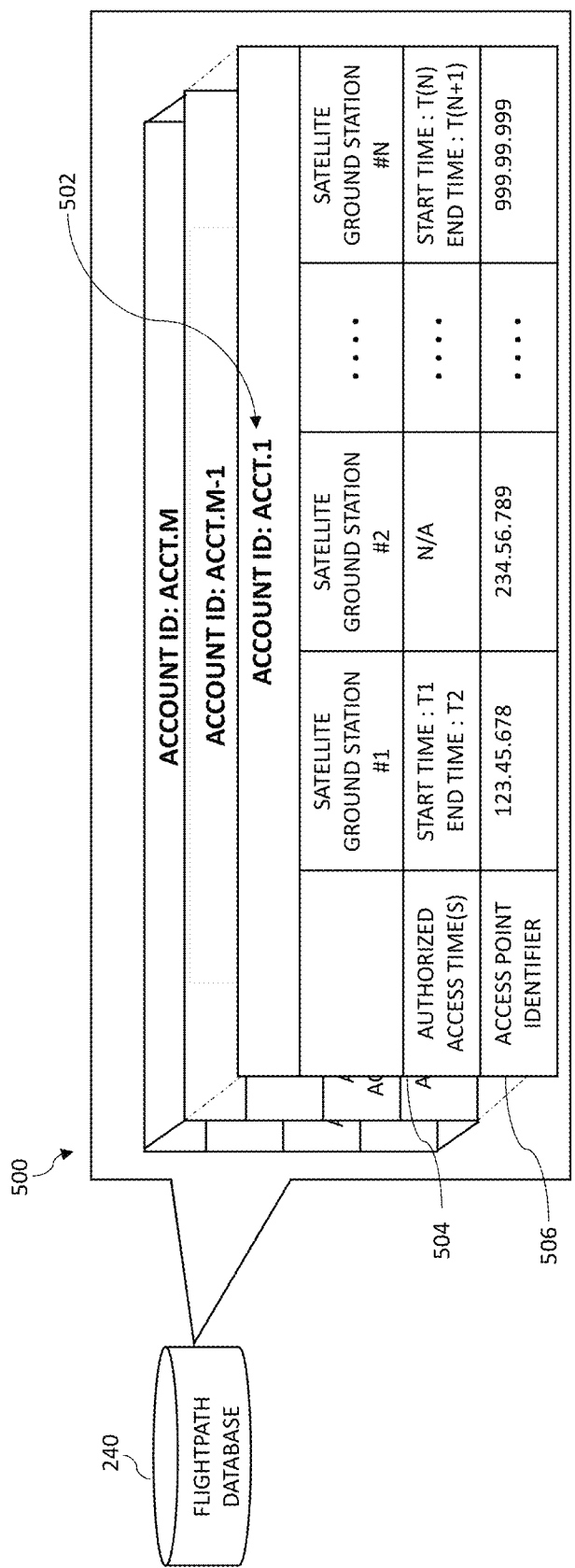
FIG. 5 is an illustrative schematic of an exemplary flightpath database used for determining a time period during which an authorized account is allowed to securely connect to a satellite ground station, in accordance with various embodiments.

FIG. 5 is an illustrative schematic of an exemplary flightpath database used for determining a time period during which an authorized account is allowed to securely connect to a ground station, in accordance with various embodiments. Flightpath database 240 may be structured using any known database organizational technique, such as those described above with reference to account database 230. In some embodiments, flightpath database 240 may include tables 500, each associated with a different account identifier 502. The number of tables M may be related to the number of rows in account database 230. For example, if table 400 of account database 230 includes M rows, each associated with one of M account identifiers, then flightpath database 240 may include M tables 500 each associated with one of the M account identifiers. Each table 500 may include information regarding when and where, e.g., a satellite ground station, a particular satellite associated with the account of account identifier 502 is accessible. In some embodiments, the data included within each table may be generated in real-time as the orbital path of the satellite is determined. For example, based on the orbital trajectory of a satellite, a determination may be made of which satellite ground stations 222 are capable of receiving transmissions from the satellite.

A table of tables 500 for account identifier 502, e.g., "ACCT.1," may include a first row 504 indicating authorized access times for the account and a second row 506 indicating an access point identifier 506 of the access points for each access time. In some embodiments, a client may submit a request, e.g., a Task Request, to have a particular task performed. The access may be determined based on the request. For instance, a determination may be made as to whether the requesting client is allowed to access a table of tables 500 and a result may be a confirmed task. That task may have a time window associated with it indicated a start time and an end time with which the task is to be performed. Each column in table 500 may indicate the access times and access point identifier associated with one of satellite ground stations 222 that the account is allowed to access via server system 210. For example, the account associated with account identifier ACCT.1 may be authorized to access a first ground site, e.g., satellite ground station 222-1, at a start time T1 until an end time T2. Furthermore, the first ground station may be accessible by connecting with an access point, e.g., satellite modem 224-1, having an access point identifier 123.45.678. In some embodiments, an account may be configured to access two or more satellite ground stations at different times. Continuing the example above, at a start time T(N), the account associated with ACCT.1 may be authorized to access an N-th satellite ground station, e.g., satellite ground station 222-N, until an end time T(N+1). In this example, an access point, e.g., satellite modem 224-N, located at the N-th satellite ground station may have an access point identifier 999.99.999.

In some embodiments, additional satellite ground station access point identifiers may be stored within table 500 for each account even if that account does not access those satellite ground stations. Satellite ground station data, such as access point identifiers for satellite modems 224 may be stored in each table 500. By doing so, if access to an additional ground site is needed at a later time, the access point identifier for that ground site is already available to the account. As an example, a second satellite ground station, e.g., satellite ground station 222-2, may have an access point identifier 234.56.789, which is stored in table 500 for the account associated with account identifier 502, even though this account has not authorized access times for the second satellite ground station. In some embodiments, an account may be authorized to access two or more different access points, e.g., satellite modems, located at one satellite ground station. In this scenario, the table 500 associated with that account may store additional access point identifiers and authorized access times for the additional access points of a particular satellite ground station. Alternatively, an additional column may be added to table 500 having a same satellite ground station but storing information associated with the additional access point identifiers of that satellite ground station and the authorized access time(s).

Returning to FIG. 2, server 206 may obtain or otherwise access the data stored within table 500 for the authorized account, e.g., the account associated with the account identifier that was determined using the device identifier extracted from the request. In some embodiments, server 206 may retrieve a copy of the data from flightpath database 240, which may then be stored in local memory associated with server 206. In some embodiments, server 206 may look up the needed data within flightpath database 240 and/or extract the needed data from flightpath database 240.

In some embodiments, server 206 may analyze the data indicating the schedule of activity associated with the identified account to determine whether the account is authorized to access a satellite ground station at a current time. In some embodiments, the satellite ground station to be accessed may be specified in the request from client device 202. However, the request may alternatively not include an indication of a particular satellite ground station 222 to be connected with. Regardless, the schedule of activity for the account may indicate the times during which each satellite ground station is accessible for each particular account. Server 206 may determine a current time using a timer or standardized clock. In some embodiments, a timing mechanism for each of server 210, client devices 202, and satellite ground stations 222 may be synchronized. For example, clocks located on each of server 210, client devices 202, and satellite ground stations 222 may be synchronized with one another using any known clock synchronization technique. As an example, each clock may be synchronized to an international atomic time. As another example, a synchronization technique for synchronizing clocks may include a flooding time synchronization protocol ("FTSP").

In some embodiments, server 206 may determine whether the current time is equal to or later than any start time and is also prior to or equal to any end time of an authorized access time period for a satellite ground station. For example, if the current time t is between times T1 and time T2, then server 206 may determine that ACCT.1 is authorized to access satellite ground station 1. In some embodiments, server 206 may determine whether the current time falls within the start time/end time range for each satellite ground station. This may include querying the start authorized access times 504 for each satellite ground station 222 as stored within table 500 for the identified account. If, however the request includes an indication of a specific satellite ground station with which access is requested, then server 206 may alternatively determine the authorized access times 504 for that satellite ground station as indicated within table 500.

If server 206 determines that there are no satellite ground stations with which the requesting account is authorized to access at the current time, then server 206 may notify client interface 212-1 of this issue. In response, client interface 212-1 may generate and send a message to the requesting client device 202 to indicate that the account is not authorized at the current time. In this scenario, client interface 212-1 may cause the secure the connection between the requesting client device 202 and server system 210 to be terminated. For example, client interface 212-1 may cause load balancer 214-1 to disconnect with client device 202 and/or satellite ground station 222 such that data transmissions between server system 210 and client device 202 and/or satellite ground station 222 are discontinued. As another example, the VPN connection established between client device 202 and server system 210 may be severed.

In some embodiments, server 206 may determine an amount of time between the current time and a start time of each satellite ground station 222 from table 500. Each of the amounts of time may then be ordered from temporally shortest to temporally longest. The temporally shortest amount of time may then be compared to connection criteria to determine whether the current time is temporally proximate to the start time of one of the satellite ground station's authorized access times 504. If so, then server 206 may allow the request to access the satellite ground station to idle until the current time equals the start time. This may allow for entities that log on slightly before the start time of their authorized access time to not have their connections terminated thereby requiring logging in again at a later time and consuming server 206 bandwidth. As an example, if a start time T1 for satellite ground station 222-1 is 10:00 AM EST, and the current time with which the request is received and processed is 9:59 AM EST, then server 206 may determine that the difference between the current time and the start time, e.g., 1:00 minute, is less than a temporal threshold criterion, e.g., 5:00 minutes, and allow the access attempt to wait until the current time is 10:00 AM EST. The connection criteria may include any temporal threshold criterion including 10 seconds, 30 seconds, 1 minute, 5 minutes, 30 minutes, and/or 1 hour, however these are exemplary.

If server 206 determines that the current time falls within the start time/end time range of one of the satellite ground station's authorized access times 504 for the identified account, then server 206 may notify site interface 212-2. In some embodiments, the notification of site interface 212-2 may include server 206 providing the access point identifier for the satellite ground station that the account is authorized to access at the current time. Site interface 212-2 may be configured to establish a secure connection with a particular satellite ground station 222 with which the identified account is authorized to access based on the current time, the authorized access time 504, and the access point identifier. Similar to client interface 212-1, site interface 212-2 may include a load balancer 214-2. In some embodiments, load balancer 214-2 may be configured to bridge connections between satellite ground stations 222 and client devices 202. In some embodiments, load balancer 214-2 may operate in a substantially similar manner as that of load balancer 214-1. Furthermore, in some embodiments, load balancer 214-2 may be omitted, and only a single load balancer, e.g., load balancer 214-1, may be used by server system 210.

In some embodiments, site interface 212-2 may establish a secure connection to the satellite ground station with which the account is authorized to access at the current time based on the access point identifier provided by server 206. As an example, if ACCT.1 is authorized to access satellite ground station 222-1 at time t, which is between start time T1 and end time T2, then server 206 may provide site interface 212-2 with access point identifier 123.45.678 to establish a secure connection with satellite modem 224-1 of satellite ground station 222-1. Site interface 212-1 may communicate with satellite modem 224-1 using access point identifier 123.45.678, and may establish a secure VPN connection with satellite modem 224-1.

After the secure connection is established between server system 210 and satellite ground station 222-1 (e.g., via satellite modem 224-1), as well as between the requesting client device and server system 210 (e.g., via client device 202-1), telemetry data may begin to be transmitted to the requesting client device. In some embodiments, server client(s) 222 may be configured to obtain telemetry data communicated from a particular satellite dish to a satellite ground station. For example, a satellite, e.g., satellite 130, may transmit data to a satellite dish at a satellite ground station, e.g., satellite dish 120 of satellite ground station 122. The data may be stored temporally or persistently in local memory of a computing system at the satellite ground station. Upon the secure connection being established between server system 210 and satellite ground station 222-1 via satellite modem 224-1, server client 220-1, which may execute on one or more processors of the computing system at satellite ground station 222-1, may be configured to provide the data to server system 210. Server system 210 may then be configured to provide the data to the requesting client device 202 via the secure connection established between client device 202 and server system 210. As a result, data may only be transmitted between satellite ground station 222 and client device 202 during the authorized access time(s) and only for those client devices authorized to access an account of server system 210. Furthermore, this results in less client devices accessing a satellite ground station's satellite modem, minimizing the chances of proprietary data for one entity being shared with another entity or from a non-authorized entity accessing proprietary data.

In some embodiments, each satellite ground station 222 may also be in communication with flightpath database 240. Flightpath database 240 may provide authorized access times and account identifiers to each satellite ground station 222. This may allow each satellite ground station 222 to store information indicating when any particular account or accounts are allowed to access their services. In some embodiments, flightpath database 240 may also include general flightpath information for each satellite's orbital trajectory. The flightpath information may be provided to each satellite ground station 222 so satellite ground station 222 can configure its satellite dish, hardware, software, and/or manpower needed to run various facilities at satellite ground station 222 for the correct times.

Figure 3:
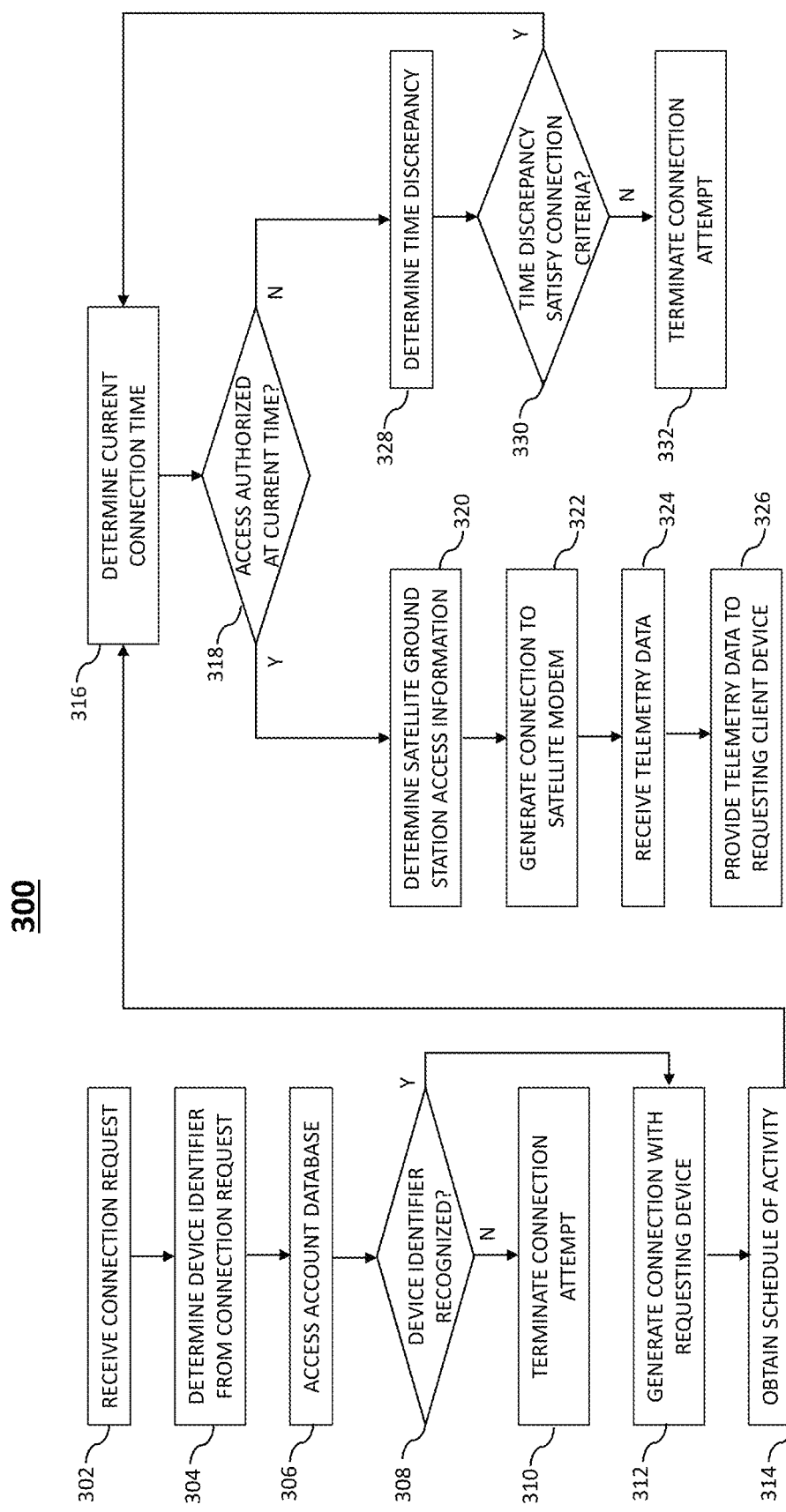
FIG. 3 is an illustrative flowchart of an exemplary process for securely connecting a client device and a satellite ground station, in accordance with various embodiments.

FIG. 3 is an illustrative flowchart of an exemplary process for securely connecting a client device and a satellite ground station, in accordance with various embodiments. In some embodiments, process 300 of FIG. 3 may begin at step 302. At step 302, a connection request may be received. In some embodiments, the connection request may be received by server system 210 from a client device 202. Multiple client devices 202 may submit connection requests to server system 210 at similar times, or at different times. At step 304, a device identifier associated with the connection request may be determined. In some embodiments, the device identifier may represent an identifier of the client device, e.g., client device 202, that the connection request was received from. For example, the connection request may include an IP address or a MAC address in a header of the connection request. In some embodiments, client interface 212-1 may receive the connection request and may be configured to extract the device identifier from the connection request. Client interface 212-1 may further be configured to provide the device identifier to a server 206 based on a determination by load balancer 214-1 of which server 206 has resources to process the request.

At step 306, an account database may be accessed. For instance, server 206 may access account database 230 to determine whether the device identifier from the connection request matches any device identifiers associated with an authorized account of server system 210. At step 308, a determination may be made as to whether the extracted device identifier is recognized. For instance, server 206 may query account database 230 using the extracted device identifier. In some embodiments, server 206 may compare the extracted device identifier to each of the device identifiers stored in columns 404 of table 400. If the device identifier is not found within columns 400, indicating that there is no authorized account associated with the extracted device identifier, then process 300 may proceed to step 310. At step 310, the connection attempt may be terminated. In some embodiments, terminating the connection attempt may include client interface 212-1 sending a message to the requesting client device 202 indicating that the device identifier is not associated with any authorized account, and access to server 210—and subsequently satellite ground stations 222—is denied.

If the device identifier is found within columns 400, then server 206 may determine the account identifier of the authorized account associated with the device identifier and process 300 may proceed to step 312. At step 312, a connection with the requesting device may be generated. In some embodiments, the connection may be a secure connection established between the requesting device (e.g., client device 202 that sent the connection request) and server system 210. As an example, a VPN connection may be established between client device 202 (e.g., via server client 204) and server 206 of server system 210. The generated connection may persist until an indication is received by server system 210 to terminate the connection. In some embodiments, the indication to terminate the connection may be as a result of the account associated with account identifier not being authorized to access a satellite ground station at the current time and/or in response to a disconnection request input at client device 202.

At step 314, a schedule of activity associated with the authorized account may be obtained. In some embodiments, server 206 may query flightpath database 240 using the account identifier determined to be associated with the device identifier of the requesting client device 202. Flightpath database 240 may include a schedule of activity for each authorized account organized by account identifier 502. The schedule of activity may indicate the authorized access times 504 of each satellite ground station (e.g., satellite ground stations 222), as well as access point identifiers 506 of those satellite ground stations. Based on the schedule of activity, it may be determined when the authorized account is allowed to access a particular satellite ground station via satellite modem 224 and the information needed for server system 210 to connect to that satellite modem.

At step 316, a current time may be determined. The current time may be obtained from an internal clock of server system 210. In some embodiments, the internal clock may be synchronized with clocks of client devices 202 and satellite ground stations 222. The error or discrepancy between a clock of client devices 202, server system 210, and satellite ground stations 222 may be relatively small, e.g., one second or less, as a result of the synchronization. In some embodiments, the clocks of client devices 202, server system 210, and satellite ground stations 222 may be synchronized periodically (e.g., daily, weekly, etc.) or upon a synchronization request. At step 318, a determination may be made as to whether the account is authorized to access at least one of the satellite ground stations at the current time. For example, server 206 may obtain the schedule of activity and may determine whether the current time falls within a start time and end time of authorized access time(s) 504 of each satellite ground station 222. If it is determined that the current time is within the range of the start time and end time of one of the satellite ground stations, then process 300 may proceed to step 320. As an example, if a current time t is equal to or later than start time T1 and prior to or equal to end time T2, then this may indicate that the authorized account associated with account identifier ACCT.1 is authorized to access the first satellite ground station, e.g., satellite ground station 222-1, at current time t.

At step 320, satellite ground station access point information may be determined for the satellite ground station authorized to accessed by the account at the current time. For example, access point information 506 for the satellite ground station, e.g., satellite ground station 222-1, that the account is authorized to access at the current time may be obtained from flightpath database 240. The access point information may include an IP address, MAC address, serial number, GPS information, or any other information that may be used to facilitate a connection to be made between server system 210 and satellite modem 224.

At step 322, a connection to the satellite modem of the satellite ground station to be accessed may be generated. In some embodiments, the connection may be generated by site interface 212-2, which may contact a corresponding satellite modem 224 using the access point information determined at step 320. As an example, the connection may be a VPN connection formed between server system 210 and satellite modem 224. At step 324, telemetry data may be received. In some embodiments, the telemetry data may be received from server client 220 of a corresponding satellite ground station via the secure connection generated between satellite modem 224 and server system 210. As an example, server client 220 of satellite ground station 222 may facilitate streamlining of the telemetry data to server system 210 via the VPN connection established between satellite modem 224 of satellite ground station 222 and server system 210. The telemetry data may include data obtained from a satellite in orbit that is associated with an entity operating a client device 202 that the connection request was received from. At step 326, the telemetry data may be provided to the requesting client device. In some embodiments, server 210 may provide the requesting client device, e.g., client device 202, with the telemetry data via the secure connection established between the requesting client device and server system 210. As an example, server client 204 of client device 202 may facilitate the receipt of the telemetry data, which may be streamed to client device 202 via the established VPN connection between client device 202 and server system 210.

However, if it is determined that the current time is not within the range of the start time and end time of one of the satellite ground stations, then process 300 may proceed to step 328. For example, if a current time t is earlier than start time T1, then this may indicate that the authorized account associated with account identifier ACCT.1 is not authorized to access satellite ground station 222-1 at current time t. At step 328, a time discrepancy may be determined. The time discrepancy may relate to a temporal difference between a current time t and a start time, e.g., start time T1, of one or more satellite ground stations 222. For example, if the satellite ground station to be accessed is satellite ground station 222-1, then the time discrepancy may correspond to a temporal difference, e.g., Δt, between current time t and start time T1.

At step 330, a determination may be made as to whether the time discrepancy satisfies connection criteria. In some embodiments, the connection criteria may include one or more rules, settings, and/or parameters to that need to be satisfied in order to not terminate the connection attempt by server 210 to satellite ground station 222. For example, if the time discrepancy is less than or equal to a threshold time difference, then this may indicate that server system 210 should wait until the current time equals the start time. By waiting, server system 210 may allow for entities attempting to connect to not be disconnected and have to re-attempt to connect in an instance where the entity logged on slightly before an authorized access time.

If, at step 330, it is determined that the time discrepancy does not satisfy the connection criteria, then process 300 may proceed to step 332. In some embodiments, if the temporal difference Δt is greater than or equal to a threshold time difference, then the temporal difference Δt may be said to not satisfy the connection criteria. As an example, the threshold time difference may be 5 seconds, 10 seconds, 30 seconds, 1 minute, 5 minutes, 15 minutes, or any other amount of time. In some embodiments, the threshold time difference and/or any other connection criteria may be pre-programmed to server system 210. In some embodiments, the threshold time difference may be learned by determining an average discrepancy between when connection requests are received and when start times of authorized access times are. In this way, the threshold time difference may be dynamic and adapt to the needs of the entities that seek to connect to satellite ground station(s) 224. At step 332, the connection attempt to satellite ground station 224 may be terminated. For example, server system 210 may notify client interface 212-1 that the connection request is not authorized to connect to a satellite ground station at the current time. Client interface 212-1 may then send a message to the requesting client device 202 indicating that the connection attempt could not be completed. If, however, at step 330 it is determined that the time discrepancy does satisfy the connection criteria, then process 300 may return to step 316 where the current time is again determined. Process 300 may then proceed to step 318 using the newly determined current time.

Figure 6:
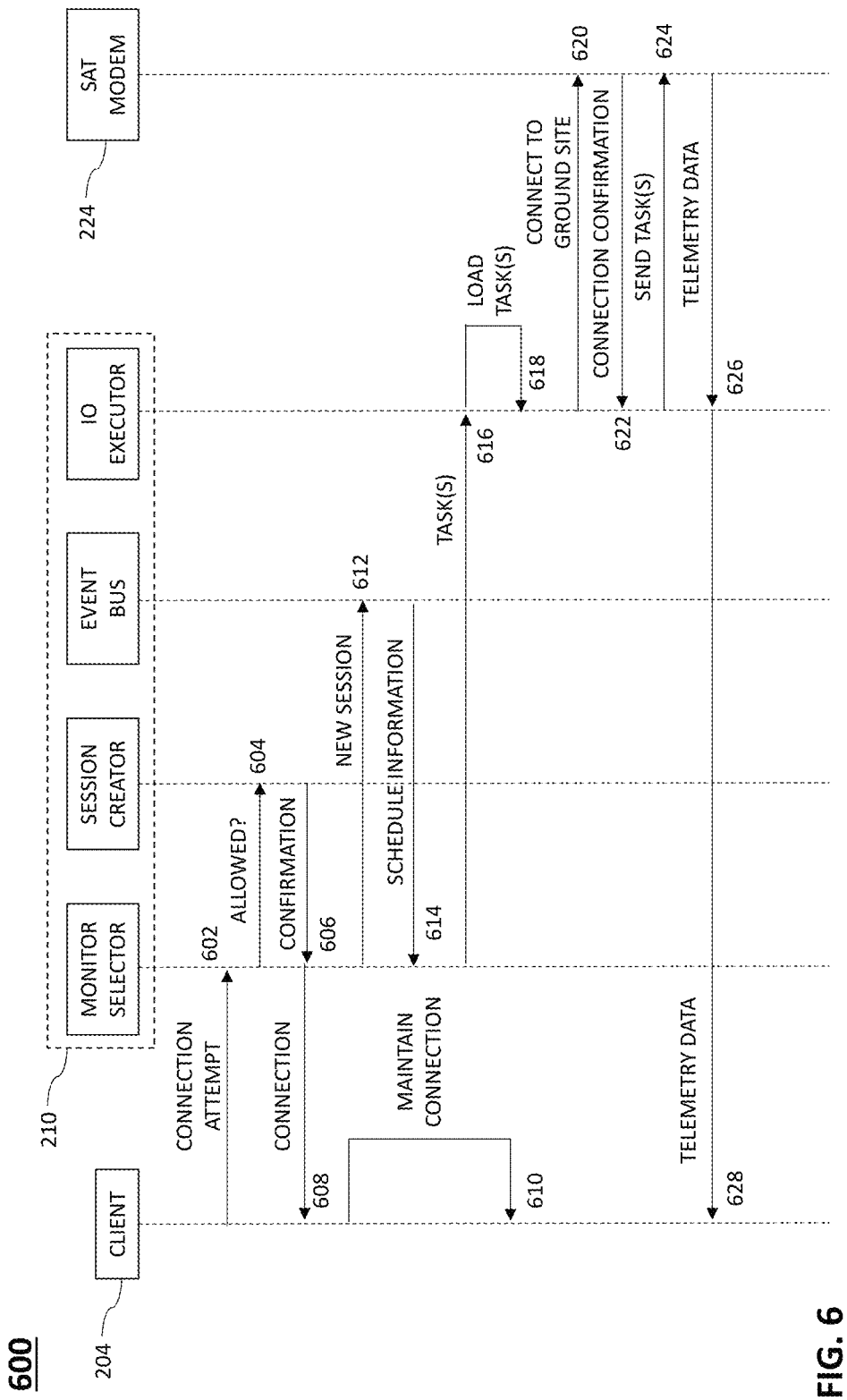
FIG. 6 is an illustrative diagram of an exemplary process for securely connecting a client device to a satellite ground station, in accordance with various embodiments.

FIG. 6 is an illustrative diagram of an exemplary process for securely connecting a client device to a satellite ground station using a multi-factor authentication technique, in accordance with various embodiments. Process 600 of FIG. 6 may begin at step 602 where a client operating on a client device sends attempts to connect to server system 210. For example, client device 202 may send a connection request to server system 210. In particular, the connection attempt may be received by a monitor selector of server system 210. The monitor select may be configured to monitor available connection ports of server system 210. Each port may represent a communication endpoint. The use of ports in communications protocols, such as transport layer protocols ("TCP") may allow for different types of communications to be transmitted to different types of endpoints. In some embodiments, the specific port to be used may be indicated by the connection request, such as within a header of the connection request.

The monitor selector may determine, at step 604, whether the connection attempt is allowed. In some embodiments, whether the connection attempt is allowed may further depend on the device identifier of the client device, which may further be indicated by the connection attempt, e.g., via a header of a connection request. A session creator of server system 210 may either allow or terminate the connection attempt depending on whether the device identifier is allowed to connect to the port. If so, then the session creator establishes a session for the connection attempt. In some embodiments, session creator may generate a confirmation message, e.g., an HTTP response, at step 606, and then the monitor selector may send a connection message to the client at step 608. In response to receiving the connection at step 608, the client may maintain the connection with server 210 at step 610. If it is determined that the device identifier does not match any device identifier associated with an authorized account (e.g., from accounts database 230), then instead of the confirmation and connection messages of steps 606 and 608, a not confirmed and terminate message, respectively, may be sent to client 204.

In some embodiments, upon determining that the device identifier is associated with an authorized account, the session creator may generate a new session at time 612. A new session event may be generated indicated that the new session has been generated for the authorized account having a determined account identifier, and the new session event may be transmitted to an event bus of server system 210. The event bus may be configured to obtain the schedule of activity for the authorized account. For example, the event bus may be responsible for accessing flightpath database 240 to obtain flightpath information for the authorized account with which the connection attempt is associated. In response to obtaining the schedule of activity, the event bus may send the schedule information, e.g., information regarding the schedule of activity, to the monitor selector at step 614. In some embodiments, the schedule information may include one or more tasks programmed by an entity operating client 204 and/or a scheduling program. Each task may indicate a particular requests that the authorized account seeks to have occur. As an example, a task may be for a particular satellite modem of a satellite ground station to stream telemetry data to a requesting client device. In some embodiments, the one or more tasks may then be sent to an IO executor of server system 210 at time 616.

The IO executor may be configured to load the one or more tasks associated with the authorized account at step 618. In some embodiments, the tasks that are loaded may correspond to all of the tasks to be performed over a period of time. For example, the tasks loaded to the IO executor may correspond to the tasks to occur in the next twenty-four hours. The IO executor may be configured to determine when to connect to a satellite ground station 222, which satellite ground station 222 to connect to at a particular time, and establish the connection with the satellite ground station 222 at the particular time. In some embodiments, each task may be associated with an instance of an IO executor which is triggered at the specific time that the task is to be performed. Then, at that time, the IO executor securely connects to satellite modem(s) 224 of the particular satellite ground station 222 or ground stations 222 if more than one at step 620.

At step 622, satellite modem 224 may send a connection confirmation back to the IO executor indicating that, for the particular task, a successful connection has been established (e.g., a VPN connection). In some embodiments, client 204 may have multiple connections to different ground sites for different times, and instead of creating a new IO executor, an already existing IO executor may a new connection associated with the authorized account connected thereto. At step 624, the one or more tasks loaded to the IO executor are sent to satellite modem 224 of the particular satellite ground station. Then, at step 626, telemetry data associated with the task(s) obtained by the satellite ground station may be sent via satellite modem 224. The telemetry data may then be provided to client 204 of the requesting client device 202 at step 628.

Figure 7:
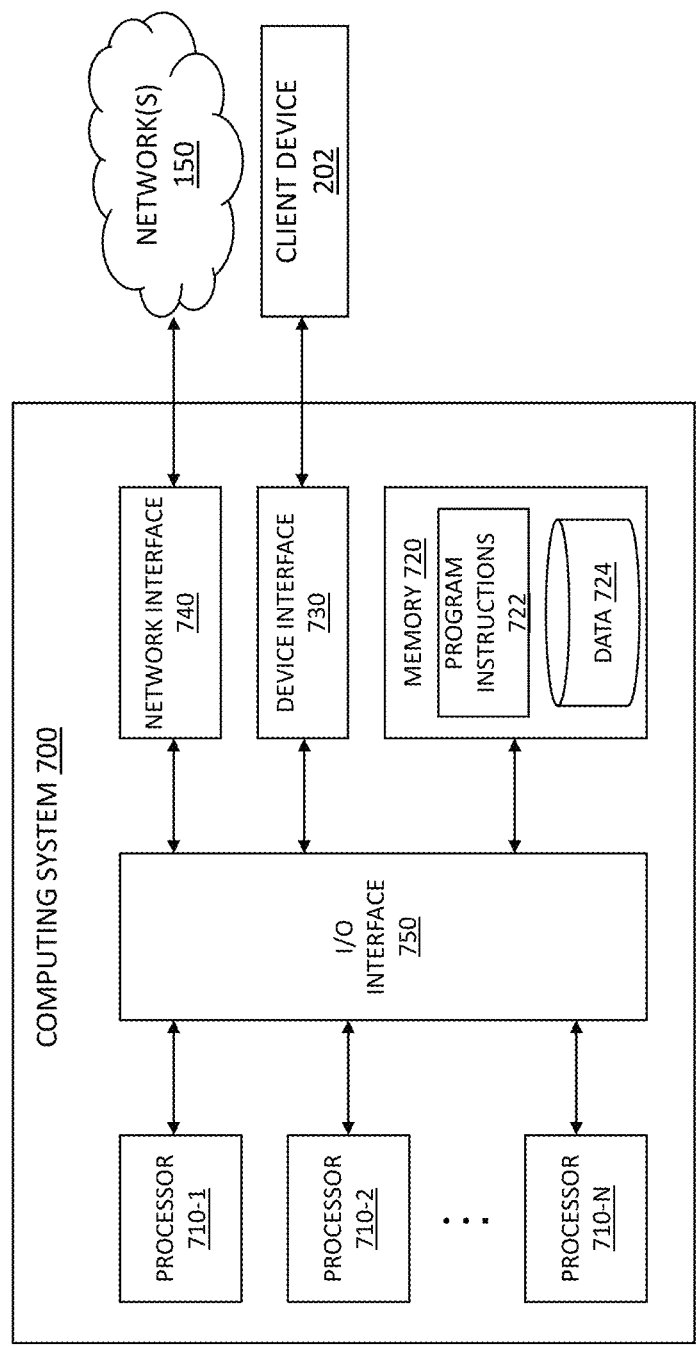
FIG. 7 is an illustrative diagram of an exemplary computing system upon which the present techniques may be implemented, in accordance with various embodiments.

FIG. 7 is an illustrative diagram of an exemplary computing device upon which the present techniques may be implemented, in accordance with various embodiments. In some cases, multiple instances of computing system 700 may communicate via a network to implement the present techniques in a distributed fashion. In some cases, instances may include a mobile computing device (like a smartphone with a camera) that captures images upon which the present techniques operate. In some cases, the instances may include server-side instances (e.g., in a micro-services architecture or monolithic architecture) that execute training and analysis with trained models. Various portions of systems and methods described herein, may include or be executed on one or more computer systems similar to computing system 700. Further, processes and modules described herein may be executed by one or more processing systems similar to that of computing system 700.

Computing system 700 may include one or more processors (e.g., processors 710-1-710-N) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710*a*), or a multi-processor system including any number of suitable processors (e.g., 710-1-710-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices, such as client device 202 or satellite modem 224 to computer system 700. I/O devices may include devices that receive input (e.g., from a user) or output information (e.g., to a user). I/O devices, e.g., client device 202, may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computing system 700 through a wired or wireless connection. I/O devices may be connected to computing system 700 from a remote location. I/O devices located on remote computer system, for example, may be connected to computing system 700 via a network and network interface 740.

Network interface 740 may include a network adapter that provides for connection of computing system 700 to a network. Network interface 740 may facilitate data exchange between computing system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 722 or data 724. Program instructions 722 may be executable by a processor (e.g., one or more of processors 710-1-710-N) to implement one or more embodiments of the present techniques. Instructions 722 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory $720$ may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory $720$ may include a non-transitory computer readable storage medium that may have program instructions stored thereon that are executable by a computer processor (e.g., one or more of processors $710\text{-}1\text{-}710\text{-}N$) to cause the subject matter and the functional operations described herein. A memory (e.g., system memory $720$) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface $750$ may be configured to coordinate I/O traffic between processors $710\text{-}1\text{-}710\text{-}N$, system memory $720$, network interface $740$, I/O devices (e.g., client device $202$), and/or other peripheral devices. I/O interface $750$ may perform protocol, timing, or other data transformations to convert data signals from one component (e.g., system memory $720$) into a format suitable for use by another component (e.g., processors $710a\text{-}710n$). I/O interface $750$ may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system $700$ or multiple computing systems $700$ configured to host different portions or instances of embodiments. Multiple computing systems $700$ may provide for parallel or sequential processing/execution of one or more portions of the techniques described herein.

Those skilled in the art will appreciate that computing system $700$ is merely illustrative and is not intended to limit the scope of the techniques described herein. Computing system $700$ may include any combination of devices or software that may perform or otherwise provide for the performance of the techniques described herein. For example, computing system $700$ may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system $700$ may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system $700$ may be transmitted to computing system $700$ via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the conversation management techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The present techniques will be better understood with reference to the following enumerated embodiments:

1. A method for communicating with a satellite, the method being implemented by one or more processors configured to execute one or more computer program instructions, the method comprising: receiving, from a client device, a request for communicating with a satellite; determining a device identifier associated with the client device; retrieving, upon determining that the device identifier is associated with an account authorized to connect to one or more satellite ground stations, a schedule of activity for the account, wherein the schedule of activity indicates a time period during which the client device is authorized to connect to the one or more satellite ground stations such that data is communicated between the satellite and the client device associated with the account, and wherein the one or more satellite ground stations are configured to communicate with the satellite; generating, at a start of the time period, a connection between the client device and the one or more satellite ground stations; and providing, via the connection, data to the client device.

2. The method of embodiment 1, wherein generating the connection comprises: establishing a virtual private network ("VPN") connection with a satellite modem located at each of the one or more satellite ground stations, wherein the satellite modem facilitates data transmission to and from the satellite.

3. The method of any of embodiments 1 or 2, further comprising: determining an end of the time period; causing the VPN connection to be disconnected at the end time such that the data transmission facilitated by the satellite modem is discontinued.

4. The method of any of embodiments 1-3, further comprising: receiving an instruction to be provided to the satellite; and providing, via the connection, the instruction to at least one of the one or more satellite ground stations, wherein the at least one of the one or more satellite ground stations is configured to provide the instruction to the satellite.

5. The method of any of embodiments 1-4, wherein the device identifier comprises an Internet Protocol ("IP") address associated with the client device, retrieving the schedule of activity for the account comprises: accessing an account database that stores a plurality of authorized accounts, wherein each authorized account includes one or more IP addresses indicating client devices allowed to access the authorized account, and each authorized account comprises a corresponding schedule of activity between one or more of the client devices allowed to access the authorized account and at least one of the one or more satellite ground stations.

6. The method of any of embodiments 1-5, further comprising: determining, from the schedule of activity for the account, one or more tasks with which data received from the satellite is to be obtained or data is to be provided to the satellite, wherein each of the one or more tasks comprises associated metadata indicating a corresponding time period that the task is to occur; accessing a clock synchronized with the one or more satellite ground stations; determining, based on the clock, a temporally proximate task to occur; and adding the temporally proximate task to a task executor to facilitate the connection to the one or more satellite ground stations being generated at the start time.

7. The method of any of embodiments 1-6, wherein the schedule of activity for the account is pre-generated based on an orbital trajectory of the satellite and a geographical location of each of the one or more satellite ground stations.

8. The method of any of embodiments 1-7, wherein providing the data comprises: buffering the data to local memory resident at the one or more satellite ground stations; and providing the data to the client device from the local memory in response to the client device requesting the data.

9. The method of any of embodiments 1-8, further comprising: receiving an additional request from an additional client device; determining an additional device identifier associated with the additional client device; determining an additional account associated with the additional device identifier, wherein the additional account is authorized to connect with the one or more satellite ground stations; retrieving an additional schedule of activity for the additional account, wherein the additional schedule of activity indicates that a connection between the additional device and the one or more satellite ground stations is unauthorized for the time period; and preventing the additional device from connecting to the one or more satellite ground stations.

10. The method of any of embodiments 1-9, wherein: each of the one or more satellite ground stations comprises a satellite dish to communicate with the satellite; the request is received at a cloud-based server configured to facilitate communications with at least one of the one or more satellite ground stations; the client device is configured to establish a first VPN connection to the cloud-based server in response to the device identifier being determined to be associated with the account; the connection comprises a second VPN connection such that the cloud-based server is configured to establish the second VPN connection to the one or more satellite ground stations in response to determining that the schedule of activity for the account indicates that the start of the time period is occurring; the data received from the satellite is provided to the client device as a stream of telemetry data; and the stream of telemetry data flows from the satellite to at least one of the one or more satellite ground stations through the second VPN connection to the cloud-based server, and through the first VPN connection from the cloud-based server to the client device.

11. A system for communicating with a satellite, the system comprising: memory comprising one or more computer program instructions; and one or more processors that, when the one or more computer program instructions are executed, are configured to perform operations of any of embodiments 1-10.

12. A tangible, non-transitory, computer-readable medium storing computing program instructions that, when executed by one or more processors, effectuate operations comprising operations of any of embodiments 1-10.

13. A method for communicating with a satellite, the method being implemented by one or more processors configured to execute one or more computer program instructions, the method comprising: retrieving, upon determining that an account of a client device is authorized to connect to a satellite ground station, a schedule of activity for the account, wherein the schedule of activity indicates a time period during which the satellite ground station is authorized to communicate data to a client device associated with the account; generating, at a start of the time period, a connection to the satellite ground station; and obtaining, via the connection, telemetry data from the satellite ground station.

14. A system for communicating with a satellite, the system comprising: memory comprising one or more computer program instructions; and one or more processors that, when the one or more computer program instructions are executed, are configured to perform operations of embodiment 13.

15. A tangible, non-transitory, computer-readable medium storing computing program instructions that, when executed by one or more processors, effectuate operations comprising operations of embodiment 13.

What is claimed is:

1. A non-transitory computer-readable medium storing computer program instructions that, when executed by one or more processors, effectuate operations comprising:
retrieving a schedule of activity for an account associated with a client device authorized to connect to a satellite ground station, wherein the schedule of activity indicates at least one time period during which the satellite ground station is authorized to communicate data to the client device, and wherein the schedule of activity is determined based at least in part on an orbital trajectory of a satellite and a geographical location of the satellite ground station;
generating a connection to the satellite ground station during the at least one time period; and
obtaining, via the connection, telemetry data from the satellite ground station to be provided to the client device.

2. The non-transitory computer-readable medium of claim 1, wherein the operations further comprise:
receiving, from the client device, a request for communicating with the satellite, wherein the schedule of activity for the account is retrieved in response to determining, based on the request, that the client device is associated with the account.

3. The non-transitory computer-readable medium of claim 1, wherein generating the connection to the satellite ground station during the time period comprises:
generating the connection to the satellite ground station at a start time of the at least one time period, wherein the connection is between the client device and the satellite ground station.

4. The non-transitory computer-readable medium of claim 3, wherein the operations further comprise:
determining an end for the at least one time period; and
causing the connection between the client device and the satellite ground station to be disconnected at the end of the at least one time period such that the telemetry data is discontinued from being provided to the client device.

5. The non-transitory computer-readable medium of claim 1, wherein the operations further comprise:
receiving, during the at least one time period, an instruction to be provided to the satellite; and
providing, via the connection, the instruction to the satellite ground station, wherein the satellite ground station is configured to provide the instruction to the satellite.

6. The non-transitory computer-readable medium of claim 1, wherein the operations further comprise:
accessing an account database that stores a plurality of accounts authorized to connect to the satellite ground station, wherein each of the plurality of accounts includes information related to one or more client devices allowed to access the account, and each account comprises a corresponding schedule of activity between the one or more client devices associated with the account and the satellite ground station.

7. The non-transitory computer-readable medium of claim 1, wherein the operations further comprise:
determining, from the schedule of activity, a task to be performed, wherein the task indicates that data received from the satellite is to be obtained or data is to be provided to the satellite, wherein the task indicates a corresponding time period when the task is to be performed;
accessing a clock synchronized with the satellite ground station;
determining, based on the clock, a temporally proximate task to occur; and
adding the temporally proximate task to a task executor to facilitate the connection to the satellite ground station being generated at a start of the corresponding time period.

8. The non-transitory computer-readable medium of claim 1, wherein the operations further comprise:
buffering the telemetry data to local memory at the satellite ground station;
receiving a request for the telemetry data from the client device; and
providing the telemetry data to the client device responsive to the request.

9. A method for communicating with a satellite, the method being implemented by one or more processors configured to execute one or more computer program instructions, the method comprising:
retrieving a schedule of activity for an account associated with a client device authorized to connect to a satellite ground station, wherein the schedule of activity indicates at least one time period during which the satellite ground station is authorized to communicate data to the client device, and wherein the schedule of activity is determined based at least in part on an orbital trajectory of a satellite and a geographical location of the satellite ground station;
generating a connection to the satellite ground station during the at least one time period; and
obtaining, via the connection, telemetry data from the satellite ground station to be provided to the client device.

10. The method of claim 9, further comprising:
receiving, from the client device, a request for communicating with the satellite, wherein the schedule of activity for the account is retrieved in response to determining, based on the request, that the client device is associated with the account.

11. The method of claim 9, wherein generating the connection to the satellite ground station during the at least one time period comprises:
generating the connection to the satellite ground station at a start time of the at least one time period, wherein the connection is between the client device and the satellite ground station.

12. The method of claim 11, further comprising:
determining an end for the at least one time period; and
causing the connection between the client device and the satellite ground station to be disconnected at the end of the at least one time period such that the telemetry data is discontinued from being provided to the client device.

13. The method of claim 9, further comprising:
receiving, during the at least one time period, an instruction to be provided to the satellite; and
providing, via the connection, the instruction to the satellite ground station, wherein the satellite ground station is configured to provide the instruction to the satellite.

14. The method of claim 9, further comprising:
accessing an account database that stores a plurality of accounts authorized to connect to the satellite ground station, wherein each of the plurality of accounts includes information related to one or more client devices allowed to access the account, and each account comprises a corresponding schedule of activity between the one or more client devices associated with the account and the satellite ground station.

15. The method of claim 9, further comprising:
determining, from the schedule of activity, a task to be performed, wherein the task indicates that data received from the satellite is to be obtained or data is to be provided to the satellite, wherein the task indicates a corresponding time period when the task is to be performed;
accessing a clock synchronized with the satellite ground station;
determining, based on the clock, a temporally proximate task to occur; and
adding the temporally proximate task to a task executor to facilitate the connection to the satellite ground station being generated at a start of the corresponding time period.

16. The method of claim 9, further comprising:
buffering the telemetry data to local memory at the satellite ground station;
receiving a request for the telemetry data from the client device; and
providing the telemetry data to the client device responsive to the request.

17. A system, comprising:
memory storing computer program instructions; and
one or more processors that, when executing the computer program instructions, effectuate operations comprising:
retrieving a schedule of activity for an account associated with a client device authorized to connect to a satellite ground station, wherein the schedule of activity indicates at least one time period during which the satellite ground station is authorized to communicate data to the client device, and wherein the schedule of activity is determined based at least in part on an orbital trajectory of a satellite and a geographical location of the satellite ground station;
generating a connection to the satellite ground station during the at least one time period; and
obtaining, via the connection, telemetry data from the satellite ground station to be provided to the client device.

18. The system of claim 17, wherein generating the connection to the satellite ground station during the at least one time period comprises generating the connection to the satellite ground station at a start time of the at least one time period, the connection being between the client device and the satellite ground station, the operations further comprise:
determining an end for the at least one time period; and
causing the connection between the client device and the satellite ground station to be disconnected at the end of the at least one time period such that the telemetry data is discontinued from being provided to the client device.

19. The system of claim 17, wherein the operations further comprise:
accessing an account database that stores a plurality of accounts authorized to connect to the satellite ground station, wherein each of the plurality of accounts includes information related to one or more client devices allowed to access the account, and each account comprises a corresponding schedule of activity between the one or more client devices associated with the account and the satellite ground station.

20. The system of claim 17, wherein the operations further comprise:
buffering the telemetry data to local memory at the satellite ground station;
receiving a request for the telemetry data from the client device; and
providing the telemetry data to the client device responsive to the request.

* * * * *